(12) United States Patent
Alcorn et al.

(10) Patent No.: US 8,140,693 B2
(45) Date of Patent: Mar. 20, 2012

(54) METHOD AND SYSTEM FOR ALLOCATING ON-DEMAND RESOURCES USING A CONNECTION MANAGER

(75) Inventors: Byron A. Alcorn, Fort Collins, CO (US); Jeffrey Joel Walls, Fort Collins, CO (US); Vern T Rhead, Fort Collin, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 23 days.

(21) Appl. No.: 12/243,403

(22) Filed: Oct. 1, 2008

(65) Prior Publication Data
US 2009/0287834 A1 Nov. 19, 2009

Related U.S. Application Data

(60) Provisional application No. 61/071,759, filed on May 15, 2008.

(51) Int. Cl.
*G06F 15/16* (2006.01)
(52) U.S. Cl. .............................. 709/229; 709/226; 726/5
(58) Field of Classification Search ................... 709/229, 709/226; 726/5
See application file for complete search history.

(56) References Cited

U.S. PATENT DOCUMENTS

| | | | |
|---|---|---|---|
| 2001/0043189 A1 * | 11/2001 | Brisebois et al. | 345/156 |
| 2005/0071643 A1 * | 3/2005 | Moghe | 713/182 |
| 2006/0218277 A1 * | 9/2006 | Birkestrand | 709/226 |
| 2008/0120302 A1 * | 5/2008 | Thompson et al. | 707/9 |
| 2009/0249060 A1 * | 10/2009 | Dossett et al. | 713/156 |
| 2010/0011425 A1 * | 1/2010 | Eyal | 726/5 |

* cited by examiner

*Primary Examiner* — Moustafa M Meky
*Assistant Examiner* — El Hadji Sall

(57) ABSTRACT

A method and system provide a user-friendly mechanism that allows the user to access remote on-demand resources through a network only when the resources are required. These on-demand resources are accessed using a connection manager that is enabled on a client when, for example, the user moves a mouse cursor to an active edge of the client computer screen. Once enabled, the connection manager allows the user access to any on-demand resources to which the user has authorization. These on-demand resources can be freed from the user when they are no longer needed, so that these resources can be used by other users.

18 Claims, 7 Drawing Sheets

METHOD AND SYSTEM FOR ALLOCATING ON-DEMAND RESOURCES USING A CONNECTION MANAGER

This application claims the benefit of U.S. Provisional Application No. 61/071,759, filed May 15, 2008.

BACKGROUND

Many computer network users on occasion need to access resources beyond what they use on a daily basis. Access to these occasionally used resources, i.e., on-demand resources, is not easy. The users have to either physically walk to the computer with the occasionally used resources, have the occasionally used resources under their desk, or have a dedicated resource in a remote data center that the users can access using remote protocols, such as remote graphics software (RGS).

Connection managers or brokers allow access to resources, such as remote systems and applications. However, current connection managers allow access to resources only at the time of initial connection for a user's daily resources. When the daily resources are accessed using a remote protocol, the client desktop is normally hidden and the screen to the remote resources desktop typically covers the entire screen of the client computer. When additional on-demand resources are needed, the user must use the client operating system to open another connection for the on-demand resources. In other words, the on-demand resources may be opened only by putting icons on the client desktop, which is inefficient.

SUMMARY

A method for allocating on-demand resources using a connection manager includes prompting a user to input a first credential on a client, verifying the first credential using authentication information stored on a server, and connecting the user, through a network, to daily resources after the user is authenticated. Upon receiving an instruction from the user to add on-demand resources, the method activates a connection manager that opens a window to allow the user to add the on-demand resources that are not currently accessed by the user.

The method may optionally include displaying the available on-demand resources using the connection manager from which the user can select if there are more than one available on-demand resources. The method may optionally include connecting the user to one or more of the on-demand resources through the network. The method may optionally include prompting the user to input a second credential associated with the on-demand resources and verifying the second credential associated with the on-demand resources.

A system for allocating on-demand resources using a connection manager includes a server that stores authentication information and a client that includes a processor executing instructions for prompting a user to input a first credential, and connecting the user to daily resources after the first credential is authenticated. Upon receiving an instruction from the user to add on-demand resources, the processor executes instructions for activating a connection manager that opens a window to allow the user to add the on-demand resources that are not currently accessed by the user. The system further includes a network that connects the user to the on-demand resources.

A computer readable medium provides instructions for allocating on-demand resources using a connection manager. The instructions are executed on a computer and comprise prompting a user to input a first credential on a client, verifying the first credential using authentication information stored on a server, and connecting the user, through a network, to daily resources after the user is authenticated. Upon receiving an instruction from the user to add on-demand resources, the instructions include activating a connection manager that opens a window to allow the user to add the on-demand resources that are not currently accessed by the user.

BRIEF DESCRIPTION OF THE DRAWINGS

Exemplary embodiments of the method and system for allocating on-demand resources using a connection manager will be described in detail with reference to the following figures, in which like numerals refer to like elements, and wherein.

DETAILED DESCRIPTION

Figure 1:
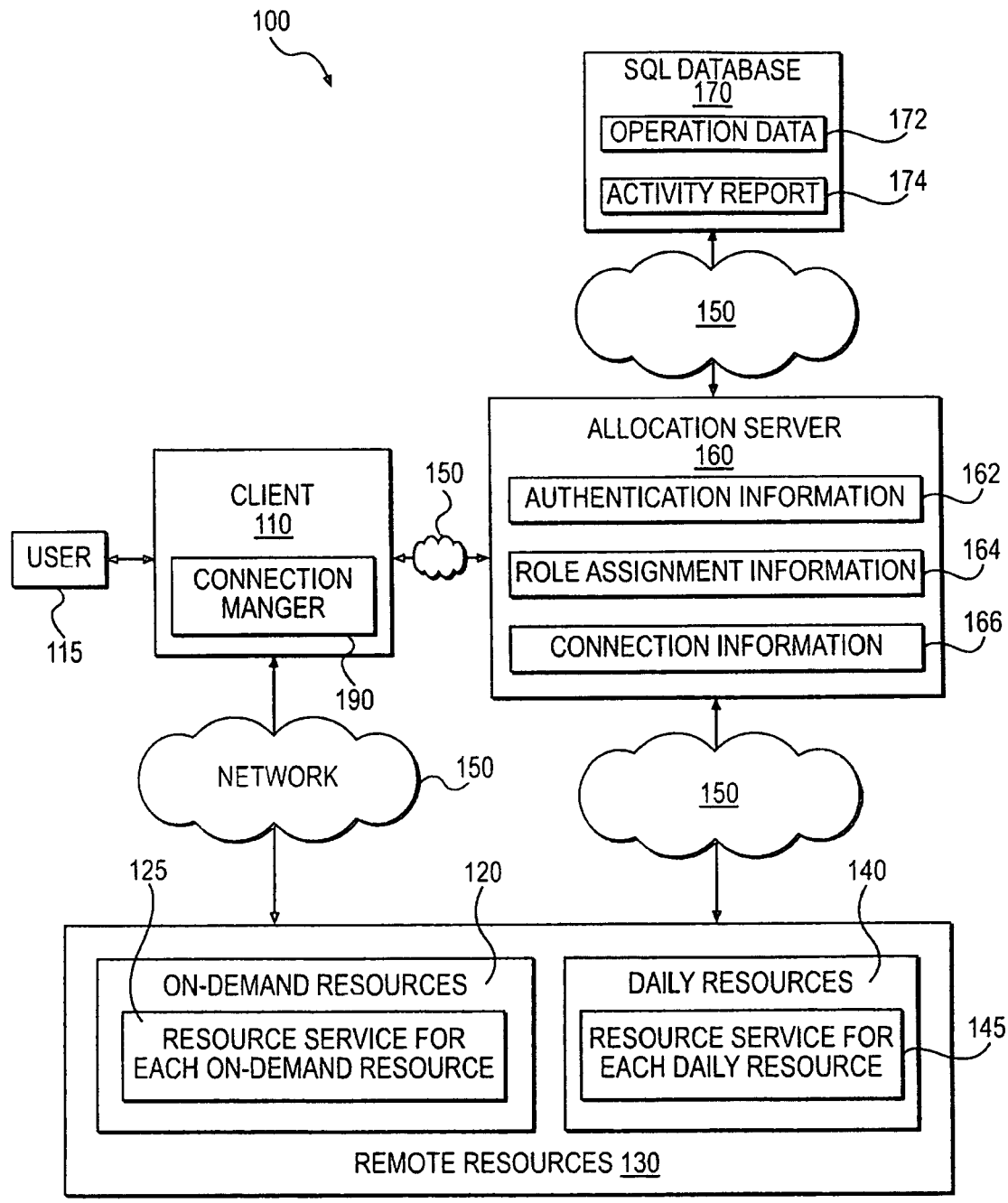
FIG. 1 illustrates an exemplary system for allocating on-demand resources using a connection manager.

Before one or more embodiments of the method and system for allocating on-demand resources using a connection manager are described in detail, one skilled in the art will appreciate that the method and system for allocating on-demand resources using a connection manager are not limited in their application to the details of construction, the arrangements of components, and the arrangement of steps set forth in the following detailed description or illustrated in the drawings. The method and system for allocating on-demand resources using a connection manager are capable of other embodiments and of being practiced or being carried out in various ways. Also, it is to be understood that the phraseology and terminology used herein is for the purpose of description and should not be regarded as limiting.

FIG. 1 illustrates an exemplary system 100 for allocating on-demand resources 120 using a connection manager 190. The exemplary system 100 includes a client 110, an allocation server 160, a structured query language (SQL) database 170, and remote resources 130.

The client 110 can be, for example, a session allocation manager (SAM) client and may run on any computing device. The client 110 includes a connection manager 190 (described in detail later) that allows access to on-demand resources 120 (described in detail later). The connection manager 190 typically accepts a command from a user 115, i.e., human user, and sends a connection request for on-demand resources 120 to the allocation server 160.

The allocation server 160 can be, for example, a SAM web server that runs on a dedicated server in a workstation data center (not shown). SAM typically manages the assignment and connection policies of remote user connections using, for example, remote graphics software (RGS). RGS allows the user 115 to access and share resources running on a remote computer over a standard computer network 150. RGS may take full advantage of the compute and graphics resources of the remote computer to deliver interactive remote access to various applications.

The remote resources 130 include daily resources 140 and the on-demand resources 120. The daily resources 140 are the resources accessed by the user 115 on a daily basis, such as a three-dimensional workstation, a processor, or a blade processor for the user's daily design work. The on-demand resources 120 are the additional resources only occasionally needed by the user 115, such as a processor, blade processor, or a workstation for computer-aided engineering (CAE) purposes. A blade or a workstation located remotely in the workstation datacenter can provide the user 115 with a fully functional and personalized desktop. The user 115 can, for example, access his personalized environments, applications, and data from almost anywhere by connecting to the centralized datacenter using the network 150.

Each remote resource 130 includes a resource service 145, 125 that runs in the background and registers each remote resource 130 into the allocation server 160, so that the allocation server 160 can maintain connection information 166 for each remote resource 130. The connection information 166 includes, for example, an Internet protocol address, a hostname, and a location of the remote resource 130. The resource service 145, 125 may be, for example, a SAM blade service.

The allocation server 160 may maintain authentication information 162 that can be used to validate the user's credentials. Alternatively, the allocation server 160 may use other domain authentication devices. For example, the allocation server 160 may validate the user name and/or password against an active directory of authorized users. The user 115 may be given access to one or more static resources, which are resources dedicated to the user 115 to ensure that the user 115 gets consistent performance for a specific task. Static resources typically are not shared by other users. Alternatively, a group of resources may be assigned a role and the user 115 may be given access to one or more roles. The allocation server 160 maintains such role assignment information 164. When the user 115 requests, for example, an on-demand resource 120, the allocation server 160 retrieves the user's role to allocate an appropriate group of resources associated with that role. If the user 115 has access to more than one role, the user 115 may be asked to select a role. A resource may be dynamically or randomly selected from the group of resources associated with that role. The allocation server 160 then returns the connection information 166 of the selected resource back to the client 110. The allocation server 160 and the remote resources 130 communicate through the standard computer network 150.

The SQL database 170 can be, for example, a SAM SQL database, and runs separately from the allocation server 160 on a SQL database server (not shown). The SQL database 170 contains operation data 172, such as connections assigned, connections dropped, connection disconnected, concurrencies, errors, and role assignment information 164. The SQL database 170 also creates and delivers activity reports 174. The SQL database 170 also communicates with the allocation server 160 over the standard computer network 150 if the SQL database 170 is located remotely from the allocation server 160.

Figure 2:
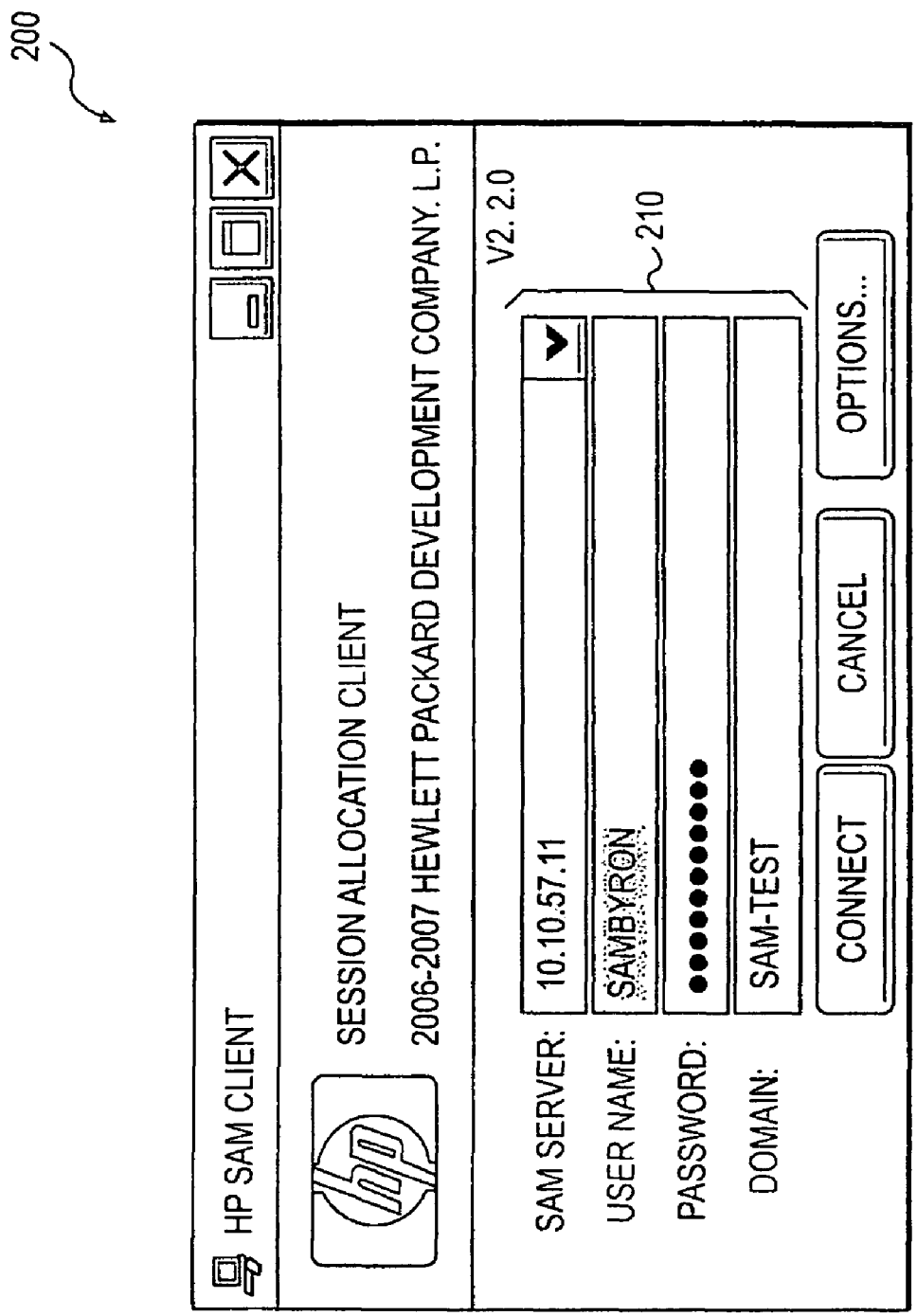
FIG. 2 is an exemplary credential screen prompting the user to enter a first credential for daily resources.

FIG. 2 is an exemplary credential screen 200 prompting the user 115 (shown in FIG. 1) to enter a first credential 210 for daily resources 140 (shown in FIG. 1). The exemplary credential screen 200 typically appears when there are no active sessions, which are active connections to remote resources, such as the daily resources 140. Examples of the first credential 210 include a user name and password, smart card reader, biometric device, or any traditional authentication device. After the first credential 210 is authenticated, the user 115 may be automatically connected to the daily resources 140 to which the user is granted access.

Figure 3A:
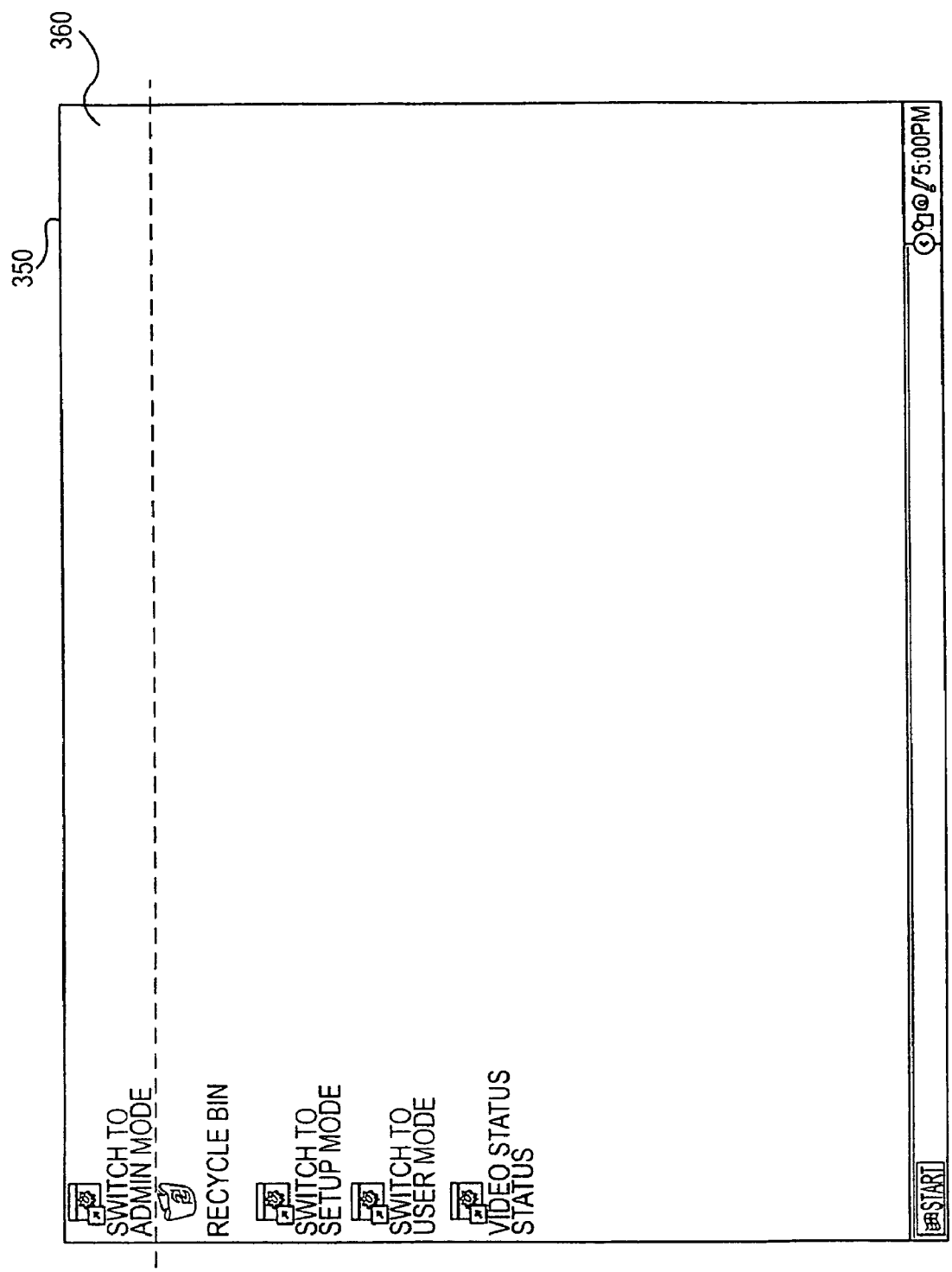
FIG. 3A illustrates an exemplary client computer screen when connected to one of the daily resources.

FIG. 3A illustrates an exemplary client computer screen 350 when connected to one of the daily resources 140. The exemplary client computer screen 350 shows a window to the remote resource desktop and an active edge 360. The client desktop is typically hidden under normal operation when the user 115 (shown in FIG. 1) is connected to the daily resources 140 (shown in FIG. 1). The user 115 typically is unaware of the client desktop. When the user 115 wants to access one or more on-demand resources 120 (shown in FIG. 1), the user 115 may move a mouse cursor (not shown) to the active edge 360 on the client computer screen 350 to enable the connection manager 190 (shown in FIG. 1) on the client desktop. The active edge 360 may be defined in a client configuration file (not shown).

The active edge 360 is the upper portion of the client computer screen 350 in the example shown in FIG. 3A. One skilled in the art will appreciate that the active edge 360 may be any portion of the client computer screen 350.

The user 115 may also activate a button on the client computer screen 350 to enable the connection manager 190. The button may be, for example, a hot-key sequence or icon that is forced to be on top of other windows. One skilled in the art will appreciate that other types of method may be equally applied to enable the connection manager 190.

Figure 3B:
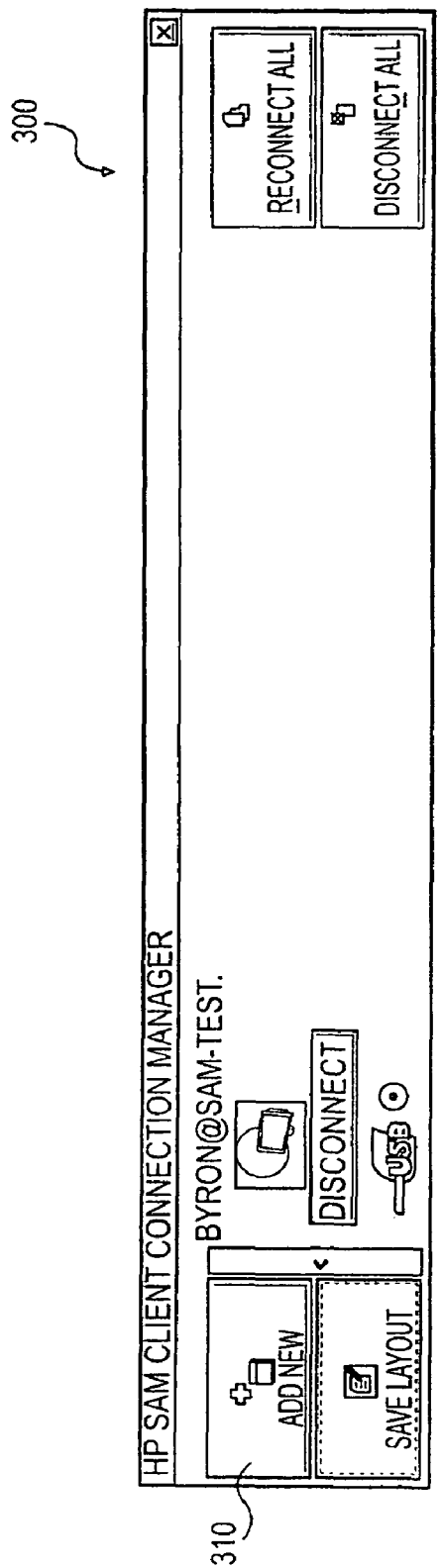
FIG. 3B illustrates an exemplary connection manager screen that appears when the connection manager is enabled.

FIG. 3B illustrates an exemplary connection manager screen 300, i.e., window, that appears when the connection manager 190 (shown in FIG. 1) is enabled. The connection manager screen 300 may, for example, appear at the bottom portion of the client computer screen 350 and may overlay the client desktop or any open application. One skilled in the art will appreciate that the connection manager screen 300 may be located at any portion of the client computer screen 350. Once enabled, the connection manager 190 allows the user 115 (shown in FIG. 1) access to any resources to which the user 115 has authorization. The connection manager 190 may use an "Add New" button 310 to allow the user 115 to add on-demand resources 120 (shown in FIG. 1).

Figure 4:
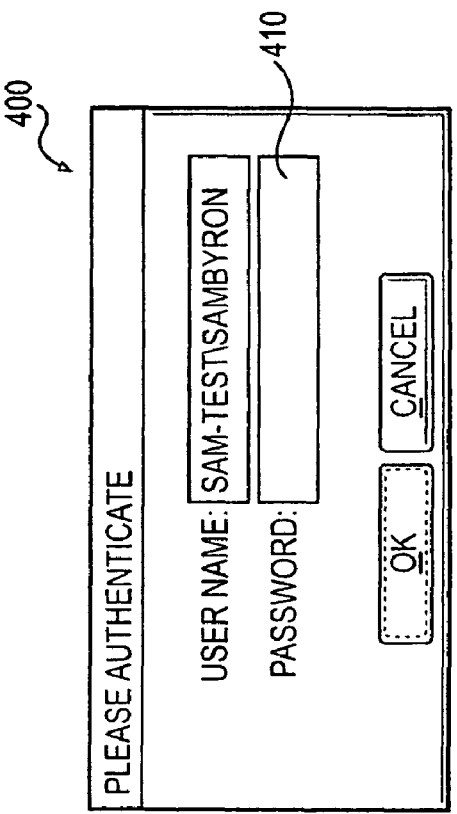
FIG. 4 illustrates an exemplary second credential screen that prompts the user for the additional credential.

FIG. 4 illustrates an exemplary second credential screen 400 that prompts the user 115 for additional credentials 410. The user 115 (shown in FIG. 1) may use his existing first credential 210 entered in FIG. 2 to access the additional on-demand resources 120 (shown in FIG. 1). However, for certain types of resources and levels of sharing, an additional credential 410, i.e., a second credential, is required. After the user 115 enters a valid second credential 410 in FIG. 4, available on-demand resources 120 to which the user 115 is granted access may be displayed. The user 115 may be automatically connected to the available on-demand resources 120. Alternatively, the user 115 may be asked to select one or more on-demand resources 120 from the available resources. The "Add New" button 310 of FIG. 3B is integrated into the running client programs so that the user 115 is prompted only for the additional on-demand resources 120 that are available, thus simplifying the user experience.

Figure 5:
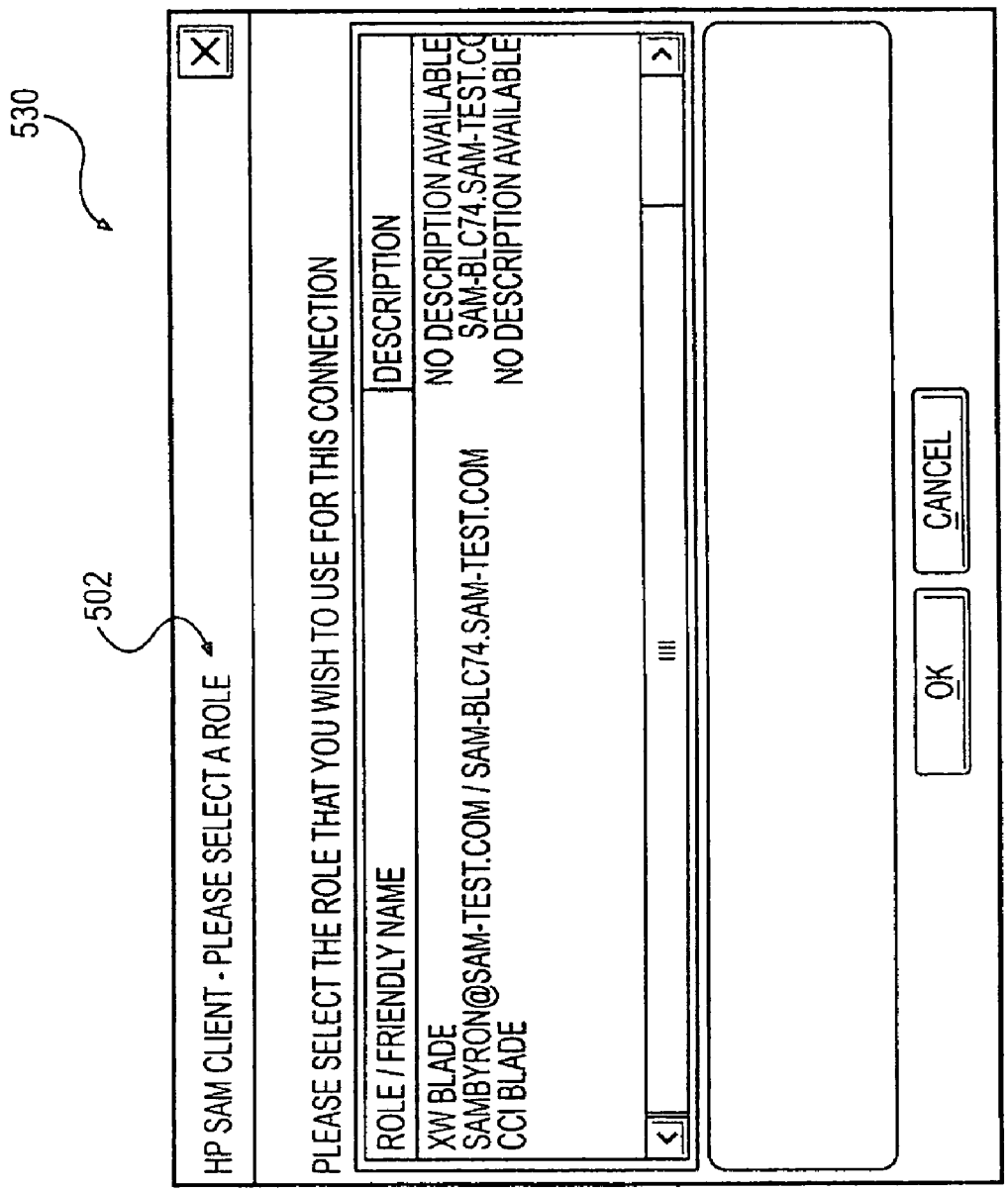
FIG. 5 illustrates an exemplary resource screen that displays the available on-demand resources from which the user can select.

FIG. 5 illustrates an exemplary resource screen 530 that displays the available on-demand resources 120 (shown in FIG. 1) from which the user 115 (shown in FIG. 1) can select. The on-demand resources 120 may be static resources that are dedicated to the user 115 and that are not shared by other users. Alternatively, the on-demand resources 120 may be a group of resources associated with a role. As noted above, if the user 115 has access to more than one resource or role, the user 115 may be asked to select a role. Referring to FIG. 5, the user 115 is asked to "select a role" 502 on the exemplary resource screen 530. After a role is selected, a resource may be dynamically selected from the group of resources associated with the role.

Figure 6:
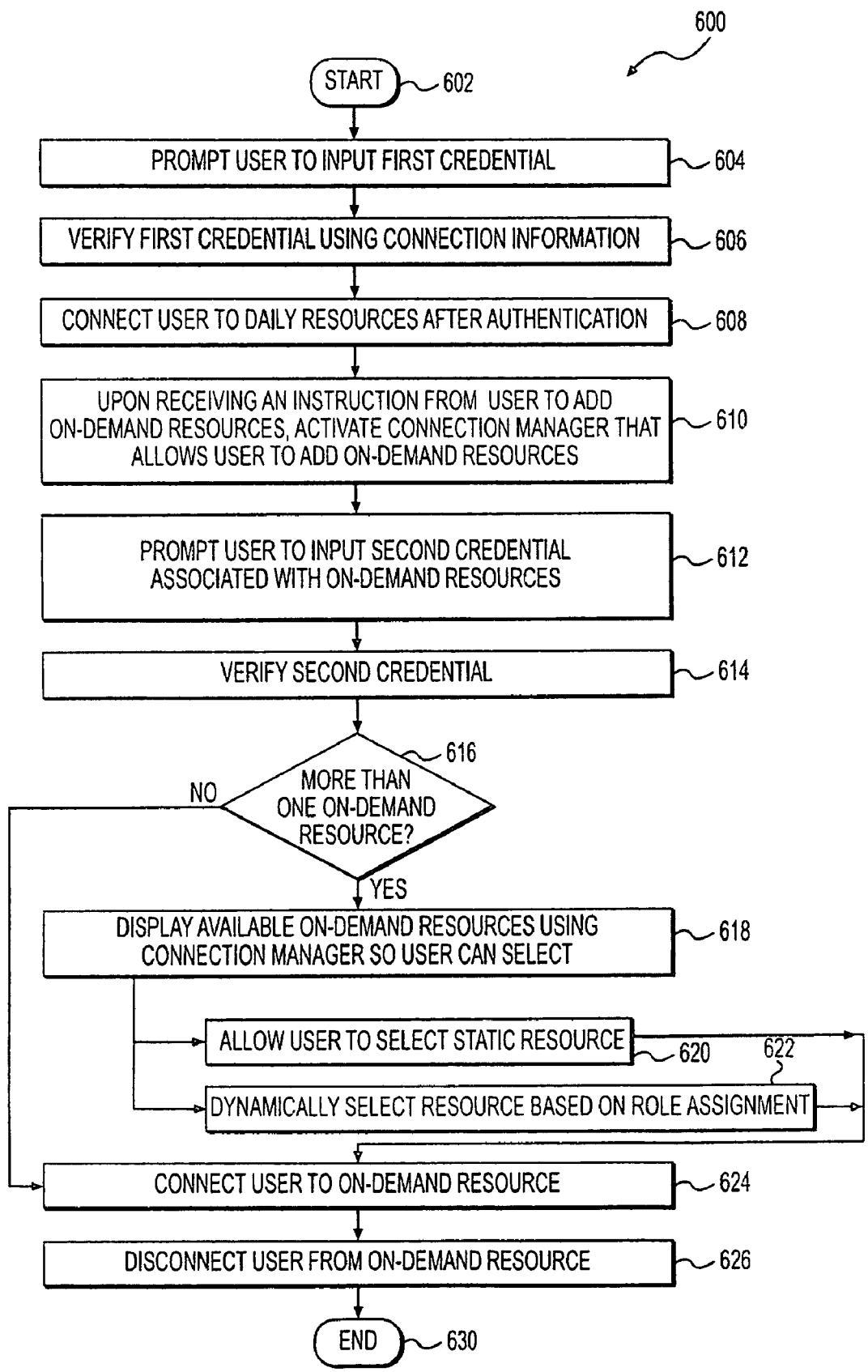
FIG. 6 is a flow chart illustrating an exemplary method for allocating on-demand resources using a connection manager.

FIG. 6 is a flow chart illustrating an exemplary method 600 for allocating on-demand resources using a connection manager. The method 600 starts 602 by prompting the user 115 to input the first credential 210 on the client 110 (block 604). Next, the method 600 verifies the first credential 210 using the connection information 166 stored, for example, on the allocation server 160 (block 606). The method 600 connects the user 115, through the network 150, to the daily resources 140 after the user 115 is authenticated (block 608). Upon receiving an instruction from the user 115 to add the on-demand resources 120, the method 600 activates the connection manager 190 that allows the user 115 to add on-demand resources 120 that are not currently accessed by the user 115 (block 610). The method 600 may optionally prompt the user 115 to input the second credential 410 associated with the on-demand resources 120 (block 612). After authentication (block 614), the method 600 determines if there are more than one on-demand resources 120 available to the user 115 (block 616). If not, the method 600 connects the user to the on-demand resource 120 (block 624). If there are more than one available on-demand resources 120, the method 600 displays the available on-demand resources 120 using the connection manager 190, so that the user 190 can select one or more of the on-demand resources 120 (block 618).

The user 115 may select a static resource that is dedicated to the user 115 (block 620). Alternatively, the method 600 may dynamically select a resource based on the user's role assignment (block 622). Next, the method 600 connects the user 115 to the selected on-demand resource 120 through the network 150 (block 624). After the user 115 finishes, the method 600 disconnects the user from the selected on-demand resource 120 (block 626) and ends at 630.

The method and system for allocating on-demand resources using a connection manager provides a user-friendly mechanism that allows the user 115 to access the on-demand resources 120 only when the resources are required. These on-demand resources 120 can be freed from the user 115 when they are no longer needed, so that these resources can be used by others. In addition, these on-demand resources 120 can be connected to the user 115 while the user 115 is connected to other remote resources, such as the daily resources 140. As a result, the on-demand resources 120 can be integrated with the daily resources 140.

The method and system for allocating on-demand resources using a connection manager may optionally provide collaboration between multiple users. For example, User A may press a "Collaborate" button (not shown) and may be presented a dialog window that requests an IP address or hostname of the requested computer. After User A enters the IP address or hostname of the requested computer, User B on the requested computer sees the collaboration request and accepts the request. User A and User B are now connected together.

Alternatively, User A presses a "Collaborate" button and may be presented a dialog window that requests a user name of the person with whom User A wishes to collaborate. User A enters User B's name, which is sent to the allocation server 160 that looks up the computer User B is logged into. User A is presented a dialog window that lists all of the computers User B is logged into and requests User A to select one computer. User A selects a computer and User B is presented a dialog window requesting a connection from User A. User B accepts and User A and User B are now connected.

Figure 7:
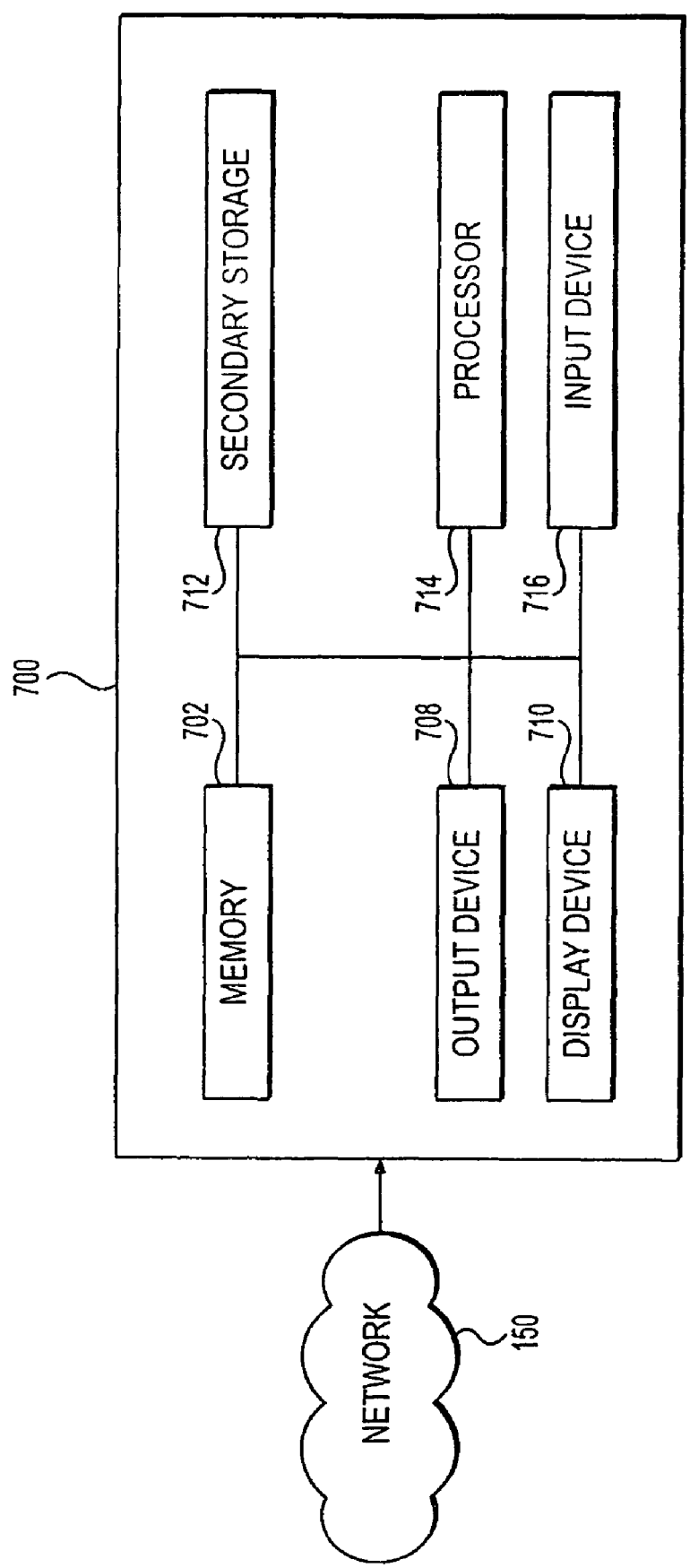
FIG. 7 illustrates exemplary hardware components of a computer that may be used in connection with the method for allocating on-demand resources using a connection manager.

FIG. 7 illustrates exemplary hardware components of a computer 700 that may be used in connection with the method for allocating on-demand resources using a connection manager. The computer 700 includes a connection with the network 150 such as the Internet or other type of computer or telephone network. The computer 700 typically includes a memory 702, a secondary storage device 712, a processor 714, an input device 716, a display device 710, and an output device 708.

The memory 702 may include random access memory (RAM) or similar types of memory. The secondary storage device 712 may include a hard disk drive, floppy disk drive, CD-ROM drive, flash memory, or other types of non-volatile data storage, and may correspond with various databases or other resources. The processor 714 may execute instructions to perform the method steps described herein. For example, the processor 714 may enable the connection manager 190 when the user wants to access additional on-demand resources 120. These instructions may be stored in the memory 702, the secondary storage 712, or received from the Internet or other network 150. The input device 716 may include any device for entering data into the computer 700, such as a keyboard, keypad, cursor-control device, touch-screen (possibly with a stylus), or microphone. The display device 710 may include any type of device for presenting a visual image, such as, for example, a computer monitor, flat-screen display, or display panel. The output device 708 may include any type of device for presenting data in hard copy format, such as a printer, and other types of output devices including speakers or any device for providing data in audio form. The computer 700 can possibly include multiple input devices, output devices, and display devices.

Although the computer 700 is depicted with various components, one skilled in the art will appreciate that the computer 700 can contain additional or different components. In addition, although aspects of an implementation consistent with the method for allocating on-demand resources using a connection manager are described as being stored in memory, one skilled in the art will appreciate that these aspects can also be stored on or read from other types of computer program products or computer-readable media, such as secondary storage devices, including hard disks, floppy disks, or CD-ROM; a signal embodied in a carrier wave from the Internet or other network; or other forms of RAM or ROM. The computer-readable media may include instructions for controlling the computer 700 to perform a particular method.

In the foregoing detailed description, systems and methods in accordance with embodiments of the method and system for allocating on-demand resources using a connection manager are described with reference to specific exemplary embodiments. Accordingly, the present specification and figures are to be regarded as illustrative rather than restrictive. The scope of the method and system for allocating on-de- Further, in describing various embodiments, the specification may present a method and/or process as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process should not be limited to the performance of their steps in the order written, and one skilled in the art can readily appreciate that the sequences may be varied and still remain within the spirit and scope of the various embodiments.

What is claimed is:

1. A computer-implemented method for allocating on-demand resources using a connection manager, comprising:
   prompting, by a client computer, a user to input a first credential on the client computer;
   verifying the first credential using authentication information stored on a server computer;
   connecting the user, through a network, to daily resources of the server computer after the user is authenticated;
   upon receiving, at the server computer, an instruction from the client computer to add on-demand resources, activating a connection manager that opens a window at the client computer to allow the user to add the on-demand resources that are not currently accessed by the user, wherein the client computer provides the instruction when a cursor moves to an active edge on a computer screen of the client computer;
   prompting the user to input a second credential associated with the on-demand resources; and
   verifying the second credential associated with the on-demand resources.

2. The method of claim 1, if there are more than one available on-demand resources, displaying the available on-demand resources using the connection manager from which the user can select.

3. The method of claim 1, further comprising connecting the user to one or more of the on-demand resources through the network.

4. The method of claim 1, wherein the active edge is defined in a configuration file stored on the client.

5. The method of claim 1, wherein the active edge is on a top portion of a computer screen.

6. The method of claim 1, wherein the user provides the instruction by activating a button on a computer screen of the client computer.

7. The method of claim 1, wherein the first credential allows the user to access the selected on-demand resources.

8. The method of claim 1, wherein the connection manager disconnects the user from the on-demand resources.

9. The method of claim 1, wherein the connection manager provides collaboration between multiple users.

10. The method of claim 1, wherein the on-demand resources are static resources that are dedicated to the user.

11. The method of claim 1, wherein the on-demand resources are selected from a group of resources.

12. The method of claim 11, wherein the group of resources is associated with roles.

13. The method of claim 12, wherein the user has access to one or more of the roles associated with the group of resources.

14. The method of claim 13, wherein the user has access to more than one role, the method further comprising prompting the user to select one of the roles.

15. A system for allocating on-demand resources using a connection manager, comprising:
   a server that stores authentication information and connection information;
   a client comprising:
      a processor executing instructions for:
         prompting a user to input a first credential,
         connecting the user to daily resources after the first credential is authenticated,
         upon receiving an instruction from the user to add on-demand resources, activating a connection manager that opens a window to allow the user to add the on-demand resources that are not currently accessed by the user, and
         prompting the user to input a second credential, wherein the second credential is associated with the on-demand resources and is verifiable; and
   a network that connects the user to the on-demand resources, wherein the instruction is provided when a cursor moves to an active edge on a computer screen of the client.

16. The system of claim 15, wherein the processor executes instructions for automatically connecting the user to one or more of the on-demand resources through the network.

17. The system of claim 15, wherein the sever stores on-demand resources that are groups of resources associated with roles, and the user selects one of the roles in order to add the on-demand resources that are associated with the one of the roles.

18. A non-transitory computer readable medium of a storage device and providing instructions for allocating on-demand resources using a connection manager, the instructions being executed on a computer and comprising:
   prompting a user to input a first credential on a client;
   verifying the first credential using authentication information stored on a server;
   connecting the user, through a network, to daily resources after the user is authenticated;
   upon receiving an instruction from the user to add on-demand resources, activating a connection manager that opens a window to allow the user to add the on-demand resources that are not currently accessed by the user, wherein the user provides the instruction by moving a cursor to an active edge on a computer screen of the client;
   prompting the user to input a second credential associated with the on-demand resources; and
   verifying the second credential associated with the on-demand resources.

* * * * *

UNITED STATES PATENT AND TRADEMARK OFFICE
CERTIFICATE OF CORRECTION

PATENT NO. : 8,140,693 B2  
APPLICATION NO. : 12/243403  
DATED : March 20, 2012  
INVENTOR(S) : Byron A. Alcorn et al.

Page 1 of 1

It is certified that error appears in the above-identified patent and that said Letters Patent is hereby corrected as shown below:

In column 8, line 35, in Claim 17, delete "sever" and insert -- server --, therefor.

Signed and Sealed this
Eighth Day of January, 2013

David J. Kappos
*Director of the United States Patent and Trademark Office*